US011723375B2

(12) United States Patent
Okoniewska et al.

(10) Patent No.: US 11,723,375 B2
(45) Date of Patent: Aug. 15, 2023

(54) SOFT BAKED PRODUCTS WITH HIGH LEVELS OF SLOWLY DIGESTIBLE STARCH

(71) Applicant: GENERALE BISCUIT, Clamart (FR)

(72) Inventors: Monika Okoniewska, East Hanover, NJ (US); Dominic J. Vellucci, East Hanover, NJ (US); Indraneil Mukherjee, East Hanover, NJ (US); Luis Rodriguez, East Hanover, NJ (US)

(73) Assignee: GENERALE BISCUIT, Clamart (FR)

( * ) Notice: Subject to any disclaimer, the term of this patent is extended or adjusted under 35 U.S.C. 154(b) by 371 days.

(21) Appl. No.: 16/753,151

(22) PCT Filed: Oct. 5, 2018

(86) PCT No.: PCT/IB2018/001259
§ 371 (c)(1),
(2) Date: Apr. 2, 2020

(87) PCT Pub. No.: WO2019/069137
PCT Pub. Date: Apr. 11, 2019

(65) Prior Publication Data
US 2020/0260741 A1  Aug. 20, 2020

Related U.S. Application Data

(60) Provisional application No. 62/569,219, filed on Oct. 6, 2017.

(51) Int. Cl.
*A21D 13/80* (2017.01)
*A21D 2/18* (2006.01)
*C08B 30/14* (2006.01)

(52) U.S. Cl.
CPC ............ *A21D 2/186* (2013.01); *A21D 13/80* (2017.01); *C08B 30/14* (2013.01)

(58) Field of Classification Search
USPC .................................................. 426/549, 496
See application file for complete search history.

(56) References Cited

U.S. PATENT DOCUMENTS 5,378,286 A * 1/1995 Chiou ..................... A23P 30/40
127/38
2007/0082109 A1 * 4/2007 Muller ..................... A23L 33/21
426/578

(Continued)

FOREIGN PATENT DOCUMENTS

CN  1292229 A  12/2006
CN  101361536 A  2/2009

(Continued)

OTHER PUBLICATIONS

European Patent Office Examination Report for EP 18 836 841.9-1102; dated Jun. 17, 2021; 4 pages.

(Continued)

*Primary Examiner* — Lien T Tran
(74) *Attorney, Agent, or Firm* — Morgan, Lewis & Bockius LLP

(57) ABSTRACT

A baked good includes a gelatinized component comprising a starch and having a total starch content, the baked good having a slowly digestible starch content of at least 15 grams per 100 grams of ready-to-eat baked good, and at least 20% of the total starch content of the baked good being gelatinized.

22 Claims, 2 Drawing Sheets

(56) References Cited

U.S. PATENT DOCUMENTS

| | | | | |
|---|---|---|---|---|
| 2014/0370178 | A1* | 12/2014 | Boursier | A21D 13/40 426/549 |
| 2016/0029646 | A1* | 2/2016 | Okoniewska | A21D 13/38 426/549 |
| 2016/0143298 | A1* | 5/2016 | Clement | A21D 2/145 426/18 |
| 2016/0235075 | A1* | 8/2016 | Okoniewska | A21D 13/062 |
| 2016/0249627 | A1* | 9/2016 | Okoniewska | A21D 13/062 426/549 |

FOREIGN PATENT DOCUMENTS

| | | |
|---|---|---|
| CN | 105348397 B | 12/2015 |
| EP | 1076067 A1 | 2/2001 |
| WO | 2017015092 A1 | 1/2017 |

OTHER PUBLICATIONS

Konuma Hiroyuki et al: "Adding value to underutilized food resources: substituting wheat flour with sago starch in cookie formulations", Journal of Agricultural Technology, Jan. 1, 2012 (Jan. 1, 2012), pp. 1067-1077, XP055811795.

Dapcevic Hadnadev Tamara R. et al: "Rheological and Breadmaking Properties of Wheat Flours Supplemented with Octenyl Succinic Anhydride-Modified Waxy Maize Starches", Food and Bioprocess Technology, vol. 7, No. 1, Mar. 21, 2013 (Mar. 21, 2013), pp. 235-247, XP055811812.

English translation of Chinese Office Action for 201880058501.1; dated Jun. 23, 2021; 17 pages.

Nang Jie et al.: "Research Advancement of Digestibility for Potato Starch"; Food & Nutrition in China, vol. 22, No. 5; dated May 25, 2016, pp. 34-37.

Yu Hansong et al.; "Preparation of Slowly Digestible Starch by Acetic Acid-hydrolysis with Autoclaving"; Cereals and Oils Processing, No. 5, pp. 49-53 & 57.

International Search Report dated Feb. 27, 2019 in connection with International Patent Application No. PCT/IB2018/001259.

Written Opinion dated Feb. 27, 2019 in connection with International Patent Application No. PCT/IB2018/001259.

Singh J., et al: "Starch Digestibility in Food Matrix: a Review", Trends in Food Science and Technology, Elsevier Science Publishers, GB, vol. 21, No. 4, Apr. 1, 2010 (Apr. 1, 2010), pp. 168-180, XP026986261, ISSN: 0924-2244 [Retrieved on Mar. 27, 2010]—the Whole Document.

Sarka Evzen et al: "New Processing and Applications of Waxy Starch (a Review)", Journal of Food Engineering, Barking, Essex, GB, vol. 206, Mar. 9, 2017 (Mar. 9, 2017), pp. 77-87, XP029969217, ISSN: 0260-8774, DOI: 10.1016/J. Foodeng. 2017.03.006—The Whole Document.

Sarka Evzen et al: "Waxy Starch as a Perspective Raw Material (a Review)", Food Hydrocolloids, Elsevier BV, NL, vol. 69, Mar. 12, 2017 (Mar. 12, 2017), pp. 402-409, XP029976057, ISSN: 0268-005X, DOI: 10.1016/J. FOODHYD. 2017.03.001—the Whole Document.

Otto B Wurzburg Ed—Alistair M Stephen et al: "Chapter 3: Modified Starches", Jan. 1, 2006 (Jan. 1, 2006), Food Polysaccharides and Their Applications (2nd Edit, CRC Press, pp. 87-118, XP009129892, ISBN: 978-0-8247-5922-3 Paragraphs [3.2.4.1], [3.2.5].

Second Office Action issued in corresponding Chinese Patent Application No. 201880058501.1; dated Apr. 8, 2022.

Akram Nadia, "Effect of Modified Cereal Starches on Dough and Bread Quality," Pakistan Journal of Agricultural Sciences, vol. 54, No. 01, Mar. 1, 2017.

European Examination Report for European Patent Application No. 18836841.9, dated Apr. 17, 2023.

* cited by examiner

SOFT BAKED PRODUCTS WITH HIGH LEVELS OF SLOWLY DIGESTIBLE STARCH

CROSS-REFERENCE TO RELATED APPLICATIONS

This application is a U.S. National Stage application of International Patent Application No. PCT/IB2018/001259 filed Oct. 5, 2018, which claims the benefit of priority of U.S. Provisional Patent Application No. 62/569,219, filed Oct. 6, 2017, which are hereby incorporated by reference in their entireties and for all purposes.

BACKGROUND OF THE INVENTION

The present invention generally relates food products, such as ready-to-eat food products including baked goods, having a high level of slowly digestible starch, including soft baked good products having a high level of slowly digestible starch.

The higher-moisture dough or batter systems of soft-baked bakery products often present a technical challenge for delivery of high levels of slowly digestible starch ("SDS"). Higher content of slowly digestible starch has been associated with various health benefits, such as continuous glucose release into the bloodstream, and low or moderate glycemic response which can be associated with sustained energy release. The present invention relates to food products which are rich in SDS. Those products can include soft textured food products such as soft cake and/or products with high levels of gelatinized starch.

BRIEF SUMMARY OF THE INVENTION

It is desirable to produce a baked good product that has a cohesive or non-crumbly structure (such as a pound cake) and high level of slowly digestible starch. Among the surprising results achieved is a baked good having a high degree of gelatinization, a low degree of crumbliness of structure and at the same time a high level of slowly digestible starch. In an embodiment, a baked good (e.g., a ready-to-eat baked good) comprises a slowly digestible starch content of at least 14 g per 100 g of the baked good, a water activity of the baked good of at least 0.7; and a total starch content of which 20% to 80% is gelatinized. In some embodiments at least 30%, or at least 50% of the total starch content is gelatinized. In other embodiments 30% to 70% of the total starch content is gelatinized.

In some embodiments the baked good consists essentially of a soft cake. In some embodiments the baked good is substantially free of inclusions, a filling and a topping.

In some embodiments of the baked good at least 5% of the total starch content is a maize starch that has been at least partially hydrolyzed by an acid. The acid may be a strong acid, for example hydrochloric acid or sulfuric acid. The acid may be a mineral acid.

In some embodiments of the baked good at least 5% of the total starch content is a sago starch. In some embodiments of the baked good the total starch content comprises a starch having an amylose ratio of 5% to 40%, or 15% to 35%. In some embodiments of the baked good the total starch content comprises a starch comprising amylopectin having an $R_{HAP}$ less than 116 nm.

In an embodiment of the invention, a method of producing a baked good (e.g., a ready-to-eat baked good) comprises admixing a starch component with one or more additional ingredients to form a batter or dough having a total starch content; and baking the batter or dough to gelatinize at least 20% of the total starch content and form the baked good, wherein the baked good has a slowly digestible starch content of at least 15 g per 100 grams of the baked good and a water activity of at least 0.7.

In some embodiments of the method of producing a baked good, the baking gelatinizes at least 30% or at least 50% of the total starch content. In other embodiments of the method of producing a baked good, the baking gelatinizes 30% to 68% of the total starch content.

In some embodiments of the method of producing a baked good, at least 5% of the total starch content is a maize starch that has been at least partially hydrolyzed by an acid. In some embodiments of the method of producing a baked good, at least 5% of the total starch content comprises a sago starch. In some embodiments of the method of producing a baked good, the total starch content comprises a starch having an amylose ratio of 5% to 40%. In some embodiments of the method of producing a baked good, the total starch content comprises a starch comprising amylopectin having an $R_{HAP}$ less than 116 nm.

BRIEF DESCRIPTION OF THE SEVERAL VIEWS OF THE DRAWINGS

The foregoing summary, as well as the following detailed description of embodiments of baked goods will be better understood when read in conjunction with the appended drawings of an exemplary embodiment. It should be understood, however, that the invention is not limited to the precise embodiments In the drawings.

DETAILED DESCRIPTION OF THE INVENTION

Figure 1:
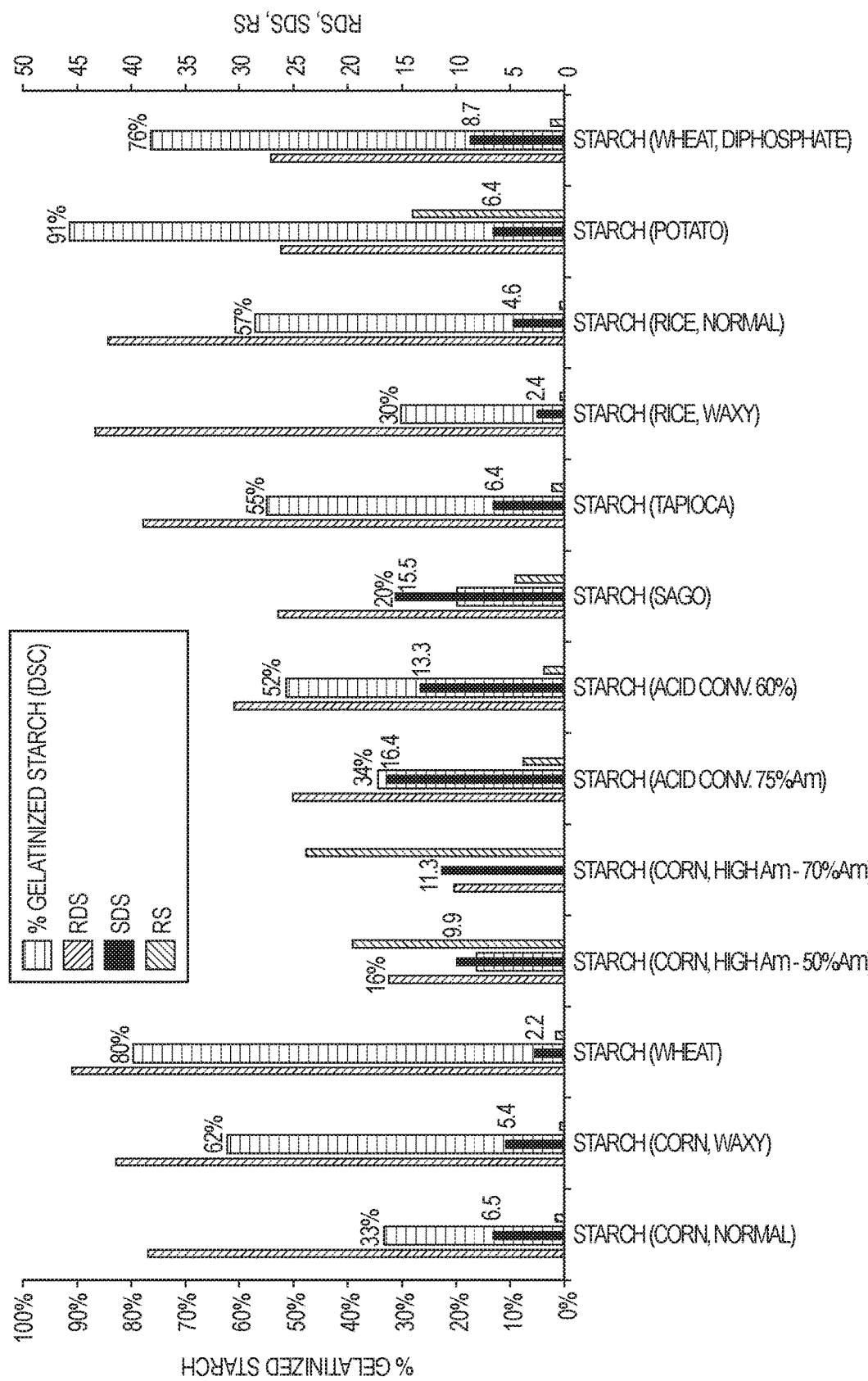
FIG. 1 is a graph of % gelatinized starch and RDS, SDS, and RS values of embodiments of the invention and controls.

Methods and compositions of some embodiments of the present invention relate to food products, such as ready-to-eat food products, including baked good products having a gelatinized component comprising a starch and having a total starch content, wherein the gelatinized component has a slowly digestible starch content over total starch content of at least 15%, and wherein at least 20% of the total starch content of the gelatinized component is gelatinized. The gelatinized component, for example, may be a cake or a portion of a cake or a biscuit or a portion of a biscuit. Thus, for example, the gelatinized component may be the base cake of a baked good that also includes a filling or a toping. Embodiments of the invention will be better understood from the description of exemplary embodiments, as described in further detail in the sections below.

In one embodiment, there is a baked good having a selected starch component (e.g., SAGO) that accommodates higher levels of gelatinzations and therefore lower crumbliness while at the same time producing higher levels of SDS.

Total available starch comprises slowly digestible starch (SDS) and rapidly digestible starch (RDS). The difference between total available starch and total starch (TS) is that total available starch does not comprise resistant starch (RS), which cannot be digested or is digested at such a slow rate that it escapes the small intestine before it can be digested to any appreciable degree. SDS, RDS, RS and TS as used herein, are defined and measured according to the Englyst method ("Classification and Measurement of Nutritionally Important Starch Fractions", Englyst et al., Eur. J. Clin. Nutr., 1992 (46) Suppl. 2:S33-50).

SDS has been associated with numerous health benefits, and food products with SDS are desired by today's consumers. However, preparing products with a soft texture often presents technical challenges for the delivery of high levels of SDS. SDS in a baked product can be derived from the starch by maintaining native structure of the starch during and after the baking process. Starch in its native form may comprise a granule including amylose and amylopectin polymer chains. The native starch may have a semi-crystalline structure. When the native starch is heated in water at a high temperature (e.g., during baking of a batter or dough) the starch granule may become gelatinized. The native starch may hydrate and swell. At least a portion of the semi-crystalline structure may break down and at least a portion of the granular structure may collapse. As the starch cools, at least a portion of the starch may retrograde. The polymeric chains of the starch may become ordered and form a crystalline structure that is ordinarily different from the crystalline structure of the native starch. The total starch content is all of the starch in the food product and may include one or more of native starch, gelatinized starch, and retrograded starch.

Gelatinized starch may be more susceptible to enzymatic digestion and as such, provide a more rapidly digestible starch component. Generally, gelatinized starch is associated with a lowered level of SDS compared to native starch. Generally, in foods with soft textures such as cakes or breads, preservation of ungelatinized (e.g., native) starch is a challenge because processing conditions and/or formulations necessary to achieve the soft texture of the cakes or breads dictate substantial or complete hydration of the ingredients, and high baking temperatures. This combination of high moisture and high baking temperatures drives starch gelatinization, which can lower the SDS content in the baked good, thereby making it difficult to provide a soft textured product with high SDS.

Retrograded starch may include substructures formed by interactions (e.g., hydrogen bonding) between two amylose chains, two amylopectin chains, or amylose and amylopectin chains. In some embodiments retrograded starch includes one or more double helical substructures. In some embodiments amylopectin-amylopectin and/or amylopectin-amylose interactions may provide a double helical structure within the starch.

Methods and compositions of some embodiments of the present invention relate to novel approaches for providing food products that are rich in SDS.

Except where described to the contrary, the embodiments of the food product described herein may be or may include a baked good, such as a soft cake, a biscuit or a bread. In some embodiments the food product is a ready to drink beverage, filling (e.g., a cold filled filling), topping, additive, or an ingredient that can be used in a soup, beverage, filling, topping, or other food product. Thus, baked products, beverages, filings, toppings, additives or ingredients described herein may embodied in the disclosed food product. In some embodiments, the gelatinized component is a base cake of a ready-to-eat baked good. As used herein base cake refers to a baked good such as a soft cake, biscuit, cookie, cracker or other baked good that does not include a separate filling or toping. Reference to ready-to-eat base cake means that the base cake has been cooked to the point where it is ready to be consumed. In some embodiments, the base cake may be combined with a filling or topping to produce a filled or topped baked good.

In some embodiments the food product has a water activity of 0.7 or greater. In some embodiments the food product has a high degree of gelatinization of starch, such as at least 30% of the total starch is gelatinized, or 30% to 70% of the total starch is gelatinized. Specifically, in some embodiments a food product is prepared from a starch that retains slowly digestible starch properties when gelatinized to a high degree, such as at least 30% of the total starch is gelatinized, and in particular 30% to 70% of the total starch is gelatinized.

In some embodiments, methods and compositions of the present invention include a food product (e.g., a food product having a degree of at least partial gelatinization as reflected herein) having a water activity ($A_W$) of at least 0.7, at least 0.8, or at least 0.9. In some embodiments a food product has a water activity of about 0.7, about 0.72, about 0.74, about 0.76, about 0.78, about 0.8, about 0.82, about 0.84, about 0.86, about 0.88, about 0.9, about 0.92, about 0.94, about 0.96, or about 0.98. In some embodiments a food product includes a soft cake having a water activity of about 0.7, about 0.72, about 0.74, about 0.76, about 0.78, about 0.8, about 0.82, about 0.84, about 0.86, about 0.88, about 0.9, about 0.92, about 0.94, about 0.96, or about 0.98.

In some embodiments of the food product, sensory attributes such as firmness and crumbliness of the food product may be quantified using a TA XT Plus texture analyzer (Stable Micro Systems) equipped with a 50 kg load cell. The food product (e.g. baked good) sample may be placed between an 80 mm diameter plate (part #TA 30) and a stainless steel test sieve with 8 mm (5/16 inch) opening (Fisher Scientific, part #04-884-1V). The food product is baked to a diameter of 60 mm and a height of about 40 mm. A tray may be placed under the sieve, directly below the sample. Compression may be applied as the plate travels downward at 1 mm/sec, squeezing the baked good, until 30% strain is achieved in the baked good. The force with which the baked good resists compression is a measure of the "firmness" of the baked good. Once the strain is removed, the remaining cake sample may be gently allowed to slide forward on the sieve (with help of a spatula) and then removed. The mass of cake crumbs that falls through the sieve (and is collected on the tray) as a result of the compression test, when expressed as a percentage of the original mass of the cake before the test may be reported as the "crumbliness" of the cake.

In some embodiments the food product has a firmness of less than 2000 g, less than 1950 g, less than 1900 g, less than 1850 g, less than 1800 g, less than 1775 g, about 2000 g, about 1950 g, about 1900 g, about 1880 g, about 1860 g, about 1840 g, about 1820 g, about 1800 g, about 1780 g, about 1760 g, about 1740 g, about 1720 g, about 1700 g, about 1680 g, about 1660 g, about 1640 g, about 1620 g, about 1600 g, 1300 g to 2000 g, 1350 g to 1950 g, 1400 g to 1900 g, 1450 g to 1850 g, 1500 g to 1800 g, 1550 g to 1800 g, 1600 g to 1800 g, or 1625 g to 1775 g, wherein the food product is baked to a diameter of about 60 mm and height of about 40 mm.

In some embodiments the food product has a crumbliness of less than 5%, less than 4%, less than 3%, less than 2%, less than 1.9%, less than 1.8%, less than 1.7%, less than 1.6%, less than 1.5%, less than 1.4%, less than 1.3%, less than 1.2%, less than 1.1%, less than 1%, less than 0.9%, less than 0.8%, less than 0.7%, less than 0.6%, less than 0.5%, less than 0.4%, less than 0.3%, less than 0.2%, less than 0.1%, about 5%, about 4%, about 3%, about 2%, about 1.9%, about 1.8%, about 1.7%, about 1.6%, about 1.5%, about 1.4%, about 1.3%, about 1.2%, about 1.1%, about 1%, about 0.9%, about 0.8%, about 0.7%, about 0.6%, about 0.5%, about 0.4%, about 0.3%, about 0.2%, about 0.1%, 0.1% to 5%, 0.1% to 4%, 0.1% to 3%, 0.1% to 2%, 0.1% to 1.5%, 0.1% to 1.4%, 0.1% to 1.2%, or 0.1% to 0.5%. In some embodiments, the food product is a soft cake with a pound cake like texture with a crumbliness of no greater than 1%.

In some embodiments the food product has a slowly digestible starch over total starch ("SDS/TS") content of at least 35%, such as at least at least 38%, at least 40%, at least 42%, at least 44%, at least 46%, at least 48%, or at least 50%. In some embodiments the food product has a SDS/TS content of about 35%, about 38%, about 40%, about 42%, about 44%, about 46%, about 48% or about 50%. In some embodiments the food product has a SDS/TS content of 35% to 50%, 35% to 40%, 40% to 50%, 40% to 48%, 40% to 46%, 40% to 44%, or 40% to 42%.

Available starch refers to the total starch in a food product minus the resistant starch (e.g., fiber). In some embodiments the food product has a slowly digestible starch over available starch ("SDS/AS") content of at least 35%, such as at least at least 38%, at least 40%, at least 42%, at least 44%, at least 46%, at least 48%, or at least 50%. In some embodiments the food product has a SDS/AS content of about 35%, about 38%, about 40%, about 42%, about 44%, about 46%, about 48% or about 50%. In some embodiments the food product has a SDS/AS content of 35% to 50%, 35% to 40%, 40% to 50%, 40% to 48%, 40% to 46%, 40% to 44%, or 40% to 42%.

In some embodiments, the food product (e.g., a baked good) has an SDS of greater than about 12 g per 100 g of food product; greater than about 13 g per 100 g of food product; greater than about 14 g per 100 g of baked good; greater than about 15 g per 100 g of food product; greater than about 16 g per 100 g of food product; greater than about 17 g per 100 g of food product; greater than about 18 g per 100 g of food product; greater than about 20 g per 100 g of food product; greater than about 22 g per 100 g of baked good; greater than about 24 g per 100 g of baked good; greater than about 26 g per 100 g of baked good; greater than about 28 g per 100 g of food product; greater than about 30 g per 100 g of baked good; about 12 g per 100 g of food product; about 14 g per 100 g of baked good; about 16 g per 100 g of baked good; about 18 g per 100 g of food product; about 20 g per 100 g of food product; about 22 g per 100 g of food product; about 24 g per 100 g of food product; about 26 g per 100 g of food product; about 28 g per 100 g of food product; or about 30 g per 100 g of food product.

In some embodiments, the food product (e.g., a baked good) has an SDS of greater than 15 and a total SDS/Available starch of greater than 40.

Starch

In some embodiments the food product (e.g., a baked good) has a total starch content that includes all of the starch in the food product (e.g., the baked good). In some embodiments, the food product comprises a gelatinized component. In some embodiments the gelatinized component has a total starch content. The total starch content generally refers to the total amount of starch from all sources including isolated starch (e.g., starch isolated from a grain), as well as starch provided in flours, grains, cereals, and other ingredients.

In some embodiments the food product has a total starch content that includes an isolated starch. An isolated starch may include an ingredient that is substantially all starch (e.g., sago starch, acid-converted starch). In some embodiments the total starch content includes a sago starch. In some embodiments the baked good includes an acid-converted starch (e.g., an acid converted maize starch).

In some embodiments, the food product has a total starch content that includes starch that has been treated with an acid to provide an acid-converted starch. Without being bound by theory, it is believed that acid conversion causes at least partial hydrolysis of amylopectin and/or amylose polymer chains of the starch granule. In some embodiments the acid may be a strong acid, and/or the acid may be a mineral acid. For example, the acid may be hydrochloric acid, sulfuric acid, or a combination thereof. In some embodiments the acid-converted starch is an acid-converted maize starch. In some embodiments, it has been found that higher levels of hydrolyzed starch increase levels of SDS. In some embodiments of the baked good, the total starch content has been hydrolyzed to a level that is the maximum degree to hydrolysis that can be practically achieved to without converting the starch to maltodextrine. In some embodiments of the baked good disclosed herein, at least 3% of the total starch content has been hydrolyzed (e.g., by acid conversion). In some embodiments of the baked good disclosed herein, at least 5% of the total starch content has been hydrolyzed (e.g., by acid conversion). In some embodiments of the baked good disclosed herein, at least 7% of the total starch content has been hydrolyzed (e.g., by acid conversion). In some embodiments of the baked good disclosed herein, at least 9% of the total starch content has been hydrolyzed (e.g., by acid conversion). In some embodiments of the baked good disclosed herein, at least 11% of the total starch content has been hydrolyzed (e.g., by acid conversion). In some embodiments of the baked good disclosed herein, at least 13% of the total starch content has been hydrolyzed (e.g., by acid conversion). In some embodiments of the baked good disclosed herein, at least 15% of the total starch content has been hydrolyzed (e.g., by acid conversion). In some embodiments of the baked good disclosed herein, at least 20% of the total starch content has been hydrolyzed (e.g., by acid conversion). In some embodiments of the baked good disclosed herein, at least 25% of the total starch content has been hydrolyzed (e.g., by acid conversion). In some embodiments of the baked good disclosed herein, at least 30% of the total starch content has been hydrolyzed (e.g., by acid conversion). In some embodiments of the baked good disclosed herein, at least 40% of the total starch content has been hydrolyzed (e.g., by acid conversion). In some embodiments of the baked good disclosed herein, at least 50% of the total starch content has been hydrolyzed (e.g., by acid conversion). In some embodiments of the baked good disclosed herein, at least 60% of the total starch content has been hydrolyzed (e.g., by acid conversion). In some embodiments of the baked good disclosed herein, at least 70% of the total starch content has been hydrolyzed (e.g., by acid conversion). In some embodiments of the baked good disclosed herein, at least 80% of the total starch content has been hydrolyzed (e.g., by acid conversion). In some embodiments of the baked good disclosed herein, at least 90% of the total starch content has been hydrolyzed (e.g., by acid conversion). In some embodiments of the baked good disclosed herein, substantially all of the total starch content has been hydrolyzed (e.g., by acid conversion). In some embodiments of the baked good disclosed herein, all of the total starch content has been hydrolyzed (e.g., by acid conversion).

The level of acid-conversion can be characterized by a method well established in the industry, i.e., Rapid Visco Analyzer ("RVA"). A typical starch analysis protocol is as follows: A starch suspension may be created by dispersing 8% starch solids (corrected for moisture) in deionized water to a total of 50 g sample. The starch suspension in water may be prepared in a standard aluminum RVA canister equipped with a plastic stirring paddle, and may then be heated to 50° C. while stirring at 960 rpm in the first 10 min of the test. Then the stirring rate may be reduced to 160 rpm and temperature may be raised to 98° C. over 4 min. The starch may be held at 98° C. for 10 min and then cooled to 65° C. within 5 min which may mark the end of the test (final viscosity). As highly acid converted starches have much lower viscosity, to increase the sensitivity of the measurement the solid content of the test can be increased up to 14%. Wang et al. Carbohydrate Polymers 52 (2003) 327-333, incorporated herein by reference in its entirety, shows that increasing acid treatment decreases viscosity of the starch.

In some embodiments the food product has a total starch content that includes an acid-converted starch having a final viscosity after acid-treatment (i.e., the viscosity of the raw ingredient, e.g., prior to baking) of less than 100 cps, less than 90 cps, less than 80 cps, less than 70 cps, less than 60 cps, less than 50 cps, less than 40 cps, about 40 cps, about 45 cps, about 50 cps, about 55 cps, about 60 cps, about 65 cps, about 70 cps, about 80 cps, about 85 cps, about 90 cps, about 100 cps, 30 cps to 100 cps, 40 cps to 90 cps, or 50 cps to 70 cps, when measured by RVA at 14% solids. In some embodiments, the final viscosity of the acid-converted starch may be indicative of the level of starch modification by such acid-conversation. For example, the viscosity may increase with the level of acid conversion.

In some embodiments of the food product at least 5% of the total starch content comprises an acid-converted maize starch. In some embodiments of the food product at least 20%, at least 25%, at least 30%, at least 35%, at least 40%, at least 45%, at least 50%, at least 55%, at least 60%, at least 65%, at least 70%, at least 75%, or at least 80% of the total starch content comprises an acid-converted maize starch. In some embodiments of the food product, about 5%, about 20%, about 25%, about 30%, about 35%, about 40%, about 45%, about 50%, about 55%, about 60%, about 65%, about 70%, about 75%, about 80%, about 85%, or about 90% of the total starch content comprises an acid-converted maize starch. In some embodiments of the food product 5% to 90%, 20% to 80%, 30% to 80%, 40% to 80%, 50% to 80%, 60% to 80%, 50% to 70%, 50% to 60%, 60% to 70%, or 70% to 80% of the total starch content comprises an acid-converted maize starch.

In some embodiments of the food product at least 2%, 3%, 4%, 5%, 6%, 7%, 8%, 9% 10%, or 15% of the total starch content is a sago starch. In some embodiments of the food product at least 20%, at least 25%, at least 30%, at least 35%, at least 40%, at least 45%, at least 50%, at least 55%, at least 60%, at least 65%, at least 70%, at least 75%, or at least 80% of the total starch content is a sago starch. In some embodiments of the food product about 5%, about 20%, about 25%, about 30%, about 35%, about 40%, about 45%, about 50%, about 55%, about 60%, about 65%, about 70%, about 75%, about 80%, about 85%, or about 90% of the total starch content is a sago starch. In some embodiments of the food product 5% to 90%, 20% to 80%, 30% to 80%, 40% to 80%, 50% to 80%, 60% to 80%, 50% to 70%, 50% to 60%, 60% to 70%, or 70% to 80% of the total starch content is a sago starch. In some embodiments of the food product all, or substantially all, of the total starch content is a sago starch.

In some embodiments of the food product at least 5% of the total starch content is an acid-converted maize starch, a sago starch, or a combination thereof. In some embodiments of the food product at least 20%, at least 25%, at least 30%, at least 35%, at least 40%, at least 45%, at least 50%, at least 55%, at least 60%, at least 65%, at least 70%, at least 75%, or at least 80% of the total starch content is an acid-converted maize starch, a sago starch, or a combination thereof. In some embodiments of the food product about 5%, about 20%, about 25%, about 30%, about 35%, about 40%, about 45%, about 50%, about 55%, about 60%, about 65%, about 70%, about 75%, about 80%, about 85%, or about 90% of the total starch content is an acid-converted maize starch, a sago starch, or a combination thereof. In some embodiments of the food product 5% to 90%, 20% to 80%, 30% to 80%, 40% to 80%, 50% to 80%, 60% to 80%, 50% to 70%, 50% to 60%, 60% to 70%, or 70% to 80% of the total starch content is an acid-converted maize starch, a sago starch, or a combination thereof.

In some embodiments of the food product the total starch content comprises gelatinized starch. The term "gelatinized starch" is understood to include both gelatinized starch that has not retrograded and gelatinized starch that has retrograded.

In some embodiments of the food product at least 20%, at least 22%, at least 24%, at least 26%, at least 28%, at least 30%, at least 32%, at least 34%, at least 36%, at least 38%, at least 40%, at least 42%, at least 44%, at least 46%, at least 48%, at least 50%, at least 52%, at least 54%, at least 56%, at least 58%, at least 60%, at least 62%, at least 64%, at least 66%, at least 68%, about 20%, about 22%, about 24%, about 26%, about 28%, about 30%, about 32%, about 34%, about 36%, about 38%, about 40%, about 42%, about 44%, about 46%, about 48%, about 50%, about 52%, about 54%, about 56%, about 58%, about 60%, about 62%, about 64%, about 66%, about 68%, 20%% to 80%, 25% to 75%, 30% to 68%, 35% to 65%, 40% to 60%, 45% to 55%, 40% to 70%, or 45% to 75% of the total starch content is gelatinized starch.

In some embodiments of the food product, the total starch content includes a starch component that may be characterized by its amylose ratio. The amylose ratio refers to the amount of amylose in the starch component relative to the total amount of amylose and amylopectin in the starch component. In some embodiments of the food product a smaller amylose ratio may lead to a higher degree of retrogradation. The amylose content may be determined by the method of Gibson et al. (Journal of Cereal Science 25 (1997) 111-119), which is incorporated herein by reference, or through a commercial testing kit (e.g., available from Megazyme product code: K-AML).

In some embodiments, the food product includes a starch component that has an amylose ratio of 40% or less, 38% or less, 36% or less, 34% or less, 32% or less, 30% or less, 28% or less, 26% or less, 24% or less, 22% or less, 20% or less, 18% or less, 16% or less, 14% or less, 12% or less, 10% or less, about 40%, about 38%, about 36%, about 34%, about 32%, about 30%, about 28%, about 26%, about 24%, about 22%, about 20%, about 18%, about 16%, about 14%, about 12%, about 10%, 2% to 50%, 5% to 40%, 5% to 35%, 10% to 30%, 12% to 30%, 14% to 30%, 16% to 30%, 18% to 30%, 20% to 30%, 22% to 30%, 24% to 30%, 26% to 30%, or 28% to 30%. In some embodiments of the food product, all of the starch components having one of the foregoing amylose ratios makes up at least 5%, at least 10%, at least 15%, at least 20%, at least 25%, at least 30%, at least 35%, at least 40%, at least 45%, or at least 50% of the total starch in the food product.

In some embodiments of the food product, the total starch content comprises a starch component having an amylose content, but the amylose content is low enough that the starch in the starch component does gelatinize when thermally treated (e.g., cooked in the presence of water at or above the starch gelatinization temperature at atmospheric pressure). In some embodiments, the food product preferably includes a starch component that is substantially free of waxy starches, for example substantially free of waxy corn, waxy potato, or waxy rice, or substantially free of other starches that are essentially free of amylose. In some embodiments of the food product there is a starch component that is substantially free of high amylose ("HAM") starches, such as HAM corn starch.

In some embodiments of the food product the total starch content comprises a starch (e.g., a starch component) including amylopectin having an average hydrodynamic radius ("$R_{HAP}$") of less than 120 nm, less than 118 nm, 116 nm, less than 114 nm, less than 112 nm, less than 110 nm, less than 108 nm, less than 106 nm, less than 104 nm, less than 102 nm, less than 100 nm, less than 60 nm, less than 58 nm, less than 56 nm, less than 54 nm, less than 52 nm, less than 50 nm, less than 48 nm, or less than 46 nm. In some embodiments of the food product the starch (e.g., the starch component) comprises amylopectin having an $R_{HAP}$ of about 120 nm, about 119 nm, about 118 nm, about 117 nm, about 116 nm, about 115 nm, about 114 nm, about 113 nm, about 112 nm, about 111 nm, about 110 nm, about 109 nm, about 108 nm, about 107 nm, about 106 nm, about 105 nm, about 104 nm, about 103 nm, about 102 nm, about 101 nm, about 100 nm, about 99 nm, about 98 nm, about 97 nm, about 96 nm, about 95 nm, about 94 nm, about 93 nm, about 92 nm, about 91 nm, about 90 nm, about 89 nm, about 88 nm, about 87 nm, about 86 nm, about 85 nm, about 84 nm, about 83 nm, about 82 nm, about 81 nm, about 80 nm, about 79 nm, about 78 nm, about 77 nm, about 76 nm, about 75 nm, about 74 nm, about 73 nm, about 72 nm, about 71 nm, about 70 nm, about 69 nm, about 68 nm, about 67 nm, about 66 nm, about 65 nm, about 64 nm, about 63 nm, about 62 nm, about 61 nm, about 60 nm, about 59 nm, about 58 nm, about 57 nm, about 56 nm, about 55 nm, about 54 nm, about 53 nm, about 52 nm, about 51 nm, about 50 nm, about 49 nm, about 48 nm, about 47 nm, about 46 nm, about 45 nm, about 44 nm, about 43 nm, about 42 nm, about 41 nm, or about 40 nm. In some embodiments of the food product there is a starch (e.g., a starch component) that comprises amylopectin having an $R_{HAP}$ between 10 nm and 117 nm, 30 nm and 116 nm, 40 nm and 116 nm, 35 nm and 50 nm, 40 nm and 50 nm, 105 nm and 116 nm, 100 nm and 116 nm, 95 nm and 116 nm, or 90 nm and 116 nm. The average hydrodynamic radius can be measured in accordance with the procedure set forth in Yu et al. Carbohydrate Polymers 161 (2017) 10-15, which is incorporated herein by reference.

In some embodiments of the food product, there is a starch component (that may include substantially all of the starch in the food product) having an amylose ratio of 40% or less, 38% or less, 36% or less, 34% or less, 32% or less, 30% or less, 28% or less, 26% or less, 24% or less, 22% or less, 20% or less, 18% or less, 16% or less, 14% or less, 12% or less, 10% or less, about 40%, about 38%, about 36%, about 34%, about 32%, about 30%, about 28%, about 26%, about 24%, about 22%, about 20%, about 18%, about 16%, about 14%, about 12%, about 10%, 2% to 50%, 5% to 40%, 5% to 35%, 10% to 30%, 12% to 30%, 14% to 30%, 16% to 30%, 18% to 30%, 20% to 30%, 22% to 30%, 24% to 30%, 26% to 30%, or 28% to 30%. In some embodiments, the food product (such as the food product in the foregoing sentence) the starch component (that may include substantially all of the starch in the food product) comprises amylopectin having an $R_{HAP}$ less than 120 nm, less than 118 nm, less than 116 nm, less than 114 nm, less than 112 nm, less than 110 nm, less than 108 nm, less than 106 nm, less than 104 nm, less than 102 nm, less than 100 nm, less than 60 nm, less than 58 nm, less than 56 nm, less than 54 nm, less than 52 nm, less than 50 nm, less than 48 nm, less than 46 nm, about 120 nm, about 118 nm, about 116 nm, about 114 nm, about 112 nm, about 110 nm, about 108 nm, about 106 nm, about 104 nm, about 102 nm, about 100 nm, about 60 nm, about 58 nm, about 56 nm, about 54 nm, about 52 nm, about 50 nm, about 49 nm, about 48 nm, about 47 nm, about 46 nm, about 45 nm, about 44 nm, about 43 nm, about 42 nm, about 41 nm, about 40 nm, between 10 nm and 120 nm, 30 nm and 119 nm, 35 nm and 118 nm, 40 nm and 116 nm, 35 nm and 50 nm, 40 nm and 50 nm, 85 nm and 120 nm, 90 nm and 119 nm, 95 nm and 118 nm, 100 nm and 117 nm, or 105 nm and 116 nm.

Some embodiments of the food product (e.g., a baked good) are substantially free (or entirely free) of waxy starches, have a starch component with an amylose ratio that is greater than 15 and a $R_{HAP}$ of less than 120 (and in some cases a $R_{HAP}$ of less than 115). Some embodiments of the food product (e.g., a baked good) are substantially free (or entirely free) of waxy starches, have a starch component with an amylose ratio that is less than 35 and a $R_{HAP}$ of less than 120 (and in some cases a $R_{HAP}$ of less than 115). Some embodiments of the food product (e.g., a baked good) are substantially free (or entirely free) of waxy starches, have a starch component with an amylose ratio that is from 15 to 35 and a $R_{HAP}$ of less than 120 (and in some cases a $R_{HAP}$ of less than 115).

Other Ingredients

In some embodiments, the food product includes a refined flour in an amount of about 30 wt % to about 100 wt % of the dry ingredients in the baked good; about 30 wt % to about 100 wt % of the dry ingredients in the baked good; about 40 wt % to about 100 wt % of the dry ingredients in the baked good; about 50 wt % to about 100 wt % of the dry ingredients in the baked good; about 60% to about 100 wt % of the dry ingredients in the baked good; about 30 wt % to about 95 wt % of the dry ingredients in the baked good; about 40 wt % to about 95 wt % of the dry ingredients in the baked good; about 50 wt % to about 95 wt % of the dry ingredients in the baked good; about 60% to about 95 wt % of the dry ingredients in the baked good; about 100 wt % of the dry ingredients in the baked good; about 99 wt % of the dry ingredients in the baked good; about 98 wt % of the dry ingredients in the baked good; about 97 wt % of the dry ingredients in the baked good; about 96 wt % of the dry ingredients in the baked good; about 95 wt % of the dry ingredients in the baked good; about 94 wt % of the dry ingredients in the baked good; about 93 wt % of the dry ingredients in the baked good; about 92 wt % of the dry ingredients in the baked good; about 91 wt % of the dry ingredients in the dry ingredients in the baked good; about 90 wt % of the dry ingredients in the dry ingredients in the baked good; about 85 wt % of the dry ingredients in the dry ingredients in the baked good; about 80 wt % of the dry ingredients in the dry ingredients in the baked good; about 75 wt % of the dry ingredients in the dry ingredients in the baked good; about 70 wt % of the dry ingredients in the dry ingredients in the baked good; about 65 wt % of the dry ingredients in the dry ingredients in the baked good; about 60 wt % of the dry ingredients in the dry ingredients in the baked good; about 55 wt % of the dry ingredients in the dry ingredients in the baked good; about 50 wt % of the dry ingredients in the dry ingredients in the baked good; about 45 wt % of the dry ingredients in the dry ingredients in the baked good; about 40 wt % of the dry ingredients in the dry ingredients in the baked good; about 35 wt % of the dry ingredients in the dry ingredients in the baked good; or about 30 wt % of the dry ingredients in the baked good.

In some embodiments, the food product may include whole grain flour in an amount of about 30 wt % to about 100 wt % of the dry ingredients in the food product; about 30 wt % to about 100 wt % of the dry ingredients in the food product; about 40 wt % to about 100 wt % of the dry ingredients in the food product; about 50 wt % to about 100 wt % of the dry ingredients in the food product; about 60% to about 100 wt % of the dry ingredients in the food product; about 30 wt % to about 95 wt % of the dry ingredients in the food product; about 40 wt % to about 95 wt % of the dry ingredients in the food product; about 50 wt % to about 95 wt % of the dry ingredients in the food product; about 60% to about 95 wt % of the dry ingredients in the food product; about 100 wt % of the dry ingredients in the food product; about 99 wt % of the dry ingredients in the food product; about 98 wt % of the dry ingredients in the food product; about 97 wt % of the dry ingredients in the food product; about 96 wt % of the dry ingredients in the food product; about 95 wt % of the dry ingredients in the food product; about 94 wt % of the dry ingredients in the food product; about 93 wt % of the dry ingredients in the food product; about 92 wt % of the dry ingredients in the food product; about 91 wt % of the dry ingredients in the food product; about 90 wt % of the dry ingredients in the food product; about 85 wt % of the dry ingredients in the food product; about 80 wt % of the dry ingredients in the food product; about 75 wt % of the dry ingredients in the food product; about 70 wt % of the dry ingredients in the food product; about 65 wt % of the dry ingredients in the food product; about 60 wt % of the dry ingredients in the food product; about 55 wt % of the dry ingredients in the food product; about 50 wt % of the dry ingredients in the food product; about 45 wt % of the dry ingredients in the food product; about 40 wt % of the dry ingredients in the food product; about 35 wt % of the dry ingredients in the food product; or about 30 wt % of the dry ingredients in the food product.

Water may be added to the food product formulations in an amount suitable to achieve, for example, the desired moisture levels in the food product. Water may be added to a dough (e.g., in addition to the moisture levels in normally stored ingredients) or batter in an amount of about 5 wt % to about 50 wt % of the weight of the dough or batter; about 5 wt % to about 45 wt % of the weight of the dough or batter; about 5 wt % to about 40 wt % of the weight of the dough or batter; about 5 wt % to about 35 wt % of the weight of the dough or batter; about 5 wt % to about 25 wt % of the weight of the dough or batter; about 5 wt % of the weight of the dough or batter; about 10 wt % of the weight of the dough or batter; about 15 wt % of the weight of the dough or batter; about 20 wt % of the weight of the dough or batter; about 25 wt % of the weight of the dough or batter; about 30 wt % of the weight of the dough or batter; about 35 wt % of the weight of the dough or batter; about 40 wt % of the weight of the dough or batter; about 45 wt % of the weight of the dough or batter; or about 50 wt % of the weight of the dough or batter.

Food products of the present invention may include fat in desired amounts. Fat may be added to the food product from any suitable source, including but not limited to shortenings and oils. In some embodiments, a food product includes canola oil, high oleic canola oil, palm oil, soybean oil, sunflower oil, cottonseed oil, hydrogenated oils, transesterified oils or combinations of thereof. The choice of the oil may depend on desired textural and nutritional properties of the food product.

In some embodiments, a food product may include fat in an amount of about 0.1 wt % to about 30 wt % of the food product; about 0.1 wt % to about 25 wt % of the food product; about 0.1 wt % to about 20 wt % of the food product; about 1 wt % to about 15 wt % of the food product; about 1 wt % to about 10 wt % of the food product; about 0.1 wt % of the food product; about 1 wt % of the food product; about 5 wt % of the food product; about 10 wt % of the food product; about 15 wt % of the food product; about 20 wt % of the food product; or about 35 wt % of the food product.

Food products of the present invention may, in some embodiments, include sweetener (e.g., sugars) in an amount of about 0.1 wt % to about 50 wt % of the food product; about 0.1 wt % to about 40 wt % of the food product; about 0.1 wt % to about 35 wt % of the food product; about 1 wt % to about 30 wt % of the food product; about 1 wt % to about 20 wt % of the food product; about 20 wt % to about 50 wt % of the food product; about 25 wt % to about 45 wt % of the food product; about 0.1 wt % of the food product; about 1 wt % of the food product; about 5 wt % of the food product; about 10 wt % of the food product; about 15 wt % of the food product; about 20 wt % of the food product; about 25 wt % of the food product; about 30 wt % of the food product; about 35 wt % of the food product; or about 40 wt % of the food product.

Baked goods of the present invention may include suitable inclusions. Inclusions may provide textural, aesthetic, as well as nutritional benefits. In baked goods of some embodiments of the present invention, an inclusion is understood to be a component of the baked good that does not become part of the gluten or dough matrix. In some embodiments, a baked good may contain inclusions such as fruit, grains, oats, rye, barley, wheat, spelt, kamut, chocolate chips, any other suitable inclusion, or combinations thereof. Suitable fruits may include but are not limited to blueberries, strawberries, raspberries, bananas, peaches, and the like, or combinations thereof. Inclusions may take the form of flakes, grits, cuts, flour, powder, shreds, clusters, grain pieces, or combinations thereof. In some embodiments baked goods of the present invention are substantially free of inclusions. Some embodiments of the present invention include no inclusions or be substantially free of inclusions yet may still attain the desired SDS and/or SDS/TS ratio and may still produce a soft cake texture.

Baked goods of some embodiments may also include ingredients such as emulsifiers, buffering agents, leavening agents, seasoning, preservatives and/or sweeteners.

Suitable emulsifiers may include but are not limited to lecithin, diacetyl tartaric ester of monoglyceride ("DATEM"), mono or diglycerides, phospholipids, caseinate, egg whites, sodium stearoyl lactylate and combinations thereof. Some embodiments of the present invention include no added emulsifiers.

Suitable leavening agents may include but are not limited to ammonium bicarbonate, sodium bicarbonate, sodium acid pyrophosphate or mixtures thereof. In one embodiment, a baked good includes a combination of ammonium bicarbonate, sodium bicarbonate, and sodium acid pyrophosphate. Some embodiments of the present invention include no added leavening agents.

Additional ingredients may include vitamins or minerals such as vitamin B1, B2, B3, B6, B12, iron, magnesium, calcium or mixtures thereof. Baked goods may also include salt, flavoring agents such as vanilla, cocoa powder, milk and dairy derivatives, honey.

Method

In some embodiments a method of producing the food product described herein comprises admixing a starch component with water to form a slurry having a total starch content. In some embodiments the method further comprises thermally treating the slurry to a gelatinization temperature. In some embodiments the method comprises thermally treating the slurry at a temperature of at least 65° C., at least 67.5° C., at least 70° C., at least 72.5° C., at least 75° C., at least 77.5° C., at least 80° C., at least 85° C., at least 90° C., at least 95° C., at least 100° C., about 65° C., about 67.5° C., about 70° C., about 72.5° C., about 75° C., about 77.5° C., about 80° C., about 85° C., about 90° C., about 95° C., about 100° C., 65° C. to 125° C., 65° C. to 100° C., 65° C. to 85° C., 65° C. to 75° C., 67.5° C. to 125° C., 67.5° C. to 100° C., 67.5° C. to 85° C., 67.5° C. to 75° C., 70° C. to 125° C., 70° C. to 100° C., 70° C. to 85° C., or 70° C. to 75° C., In some embodiments the method comprises thermally treating the slurry via RVA. In other embodiments the method comprises thermally treating the slurry in a hot water bath.

In some embodiments a method of producing the food product described herein comprises admixing a starch component as described herein with one or more additional ingredients to form a batter or dough having a total starch content. In some embodiments the method further comprises baking the batter or dough to gelatinize at least a portion of the total starch content and form a food product. In some embodiments the food product has a slowly digestible starch content of at least 15% and a water activity of at least 0.7.

In some embodiments the method includes baking the batter or dough to reach an internal temperature of at least 95° C., at least 100° C., or at least 105° C. In a continuous commercial oven, the temperature profile may vary based on oven length, number of heating zones, air flow, and bake time, among other factors. In some embodiments the oven temperature may be adjusted to decrease or minimize bake time.

In some embodiments the method includes baking the batter or dough at a temperature of at least 100° C., at least 110° C., at least 115° C., at least 120° C., at least 125° C., at least 130° C., at least 135° C., at least 140° C., at least 145° C., at least 150° C., at least 155° C., at least 160° C., at least 170° C., at least 180° C., at least 190° C., about 100° C., about 110° C., about 115° C., about 120° C., about 125° C., about 130° C., about 135° C., about 140° C., about 145° C., about 150° C., about 155° C., about 160° C., about 165° C., about 170° C., about 175° C., about 180° C., 100° C. to 180° C., 110° C. to 180° C., 120° C. to 180° C., 130° C. to 180° C., 140° C. to 180° C., or 150° C. to 170° C.

In some embodiments the method further comprises cooling the baked good to retrograde at least a portion of the starch. In some embodiments a method comprises cooling the baked good at room temperature.

Non-limiting examples of embodiments of the present invention include the following:

(1) A baked good (e.g., ready-to-eat baked good) comprising a slowly digestible starch content of at least 14 g per 100 g of the baked good, a water activity of the baked good of at least 0.7; and a total starch content of which 20% to 80% is gelatinized.

(2) The baked good of (1) wherein the baked good consists essentially of a soft cake.

(3) The baked good of any one of (1)-(2), wherein the baked good is substantially free of inclusions, a filling and a topping.

(4) The baked good according to any one of (1)-(3), wherein at least 30% of the total starch content of the is gelatinized.

(5) The baked good according to any one of (1)-(3), wherein at least 50% of the total starch content of the baked good is gelatinized.

(6) The baked good according to any one of (1)-(4), wherein 30% to 70% of the total starch content of the baked good is gelatinized.

(7) The baked good according to any one of (1)-(6), wherein at least 5% of the total starch content is a maize starch that has been at least partially hydrolyzed by an acid.

(8) The baked good according to (7), wherein the acid is a strong acid.

(9) The baked good according to (7), wherein the acid is a mineral acid.

(10) The baked good according to (8), wherein the strong acid is hydrochloric acid.

(11) The baked good according to (8), wherein the strong acid is sulfuric acid.

(12) The baked good according to any one of (1)-(11), wherein at least 5% of the total starch content is a sago starch.

(13) The baked good according to any one of claims (1)-(12), wherein the total starch content comprises a starch having an amylose ratio of 5% to 40%.

(14) The baked good according to any one of claims (1)-(12), wherein the total starch content comprises a starch having an amylose ratio of 15% to 35%.

(15) The baked good according to any one of claims (1)-(14), wherein the total starch content comprises a starch comprising amylopectin having an $R_{HAP}$ less than 116 nm.

(16) A method of producing a baked good (e.g., ready-to-eat baked good) comprising admixing a starch component with one or more additional ingredients to form a batter or dough having a total starch content; baking the batter or dough to gelatinize at least 20% of the total starch content and form the baked good, wherein the baked good has a slowly digestible starch content of at least 15 g per 100 grams of the baked good and a water activity of at least 0.7.

(17) The method according to (16), wherein the baking gelatinizes at least 30% of the total starch content.

(18) The method according to (16), wherein the baking gelatinizes at least 50% of the total starch content.

(19) The method according to (16), wherein the baking gelatinizes 30% to 68% of the total starch content.

(20) The method according to any one of (16)-(19), wherein at least 5% of the total starch content is a maize starch that has been at least partially hydrolyzed by an acid.

(21) The method according to any one of (16)-(19), wherein at least 5% of the total starch content comprises a sago starch.

(22) The method according to any one of (16)-(21), wherein the total starch content comprises a starch having an amylose ratio of 5% to 40%.

(23) The baked good according to any one of (16)-(22), wherein the total starch content comprises a starch comprising amylopectin having an $R_{HAP}$ less than 116 nm.

EXAMPLES

Throughout the Examples, "High acid converted maize starch" refers to a starch that has been converted by acid to a viscosity of about 45 cPs (also referred to as "Hi AC").

"Low acid converted maize starch" refers to a starch that has been converted by acid to a viscosity of about 65 cPs (also referred to as "Low AC").

Example 1

A cake (in this instance, a baked good having pound cake-like texture), according to an embodiment of the invention was prepared according to the formulation provided in Table 1.

|  | Batter (g) | Batter (%) |
| --- | --- | --- |
| STAGE 1 |  |  |
| Whole grain soft wheat flour | 217.84 | 42.71 |
| Sucrose | 99.55 | 19.52 |
| Sodium Acid Pyrophosphate | 1.59 | 0.31 |
| Sodium bicarbonate | 1.13 | 0.22 |
| Salt | 0.86 | 0.17 |
| STAGE 2 |  |  |
| Water | 49.10 | 9.63 |
| Whole eggs | 62.04 | 12.16 |
| Glycerin | 28.55 | 5.60 |
| STAGE 3 |  |  |
| Canola oil | 45.38 | 8.90 |
| Lecithin | 3.97 | 0.78 |
| TOTAL | 510.01 | 100.00 |

The Stage 1 flour and powders were mixed with a standard Hobart mixer at low speed (speed 1) for 1 minute. The Stage 2 liquids including eggs were added and mixed with the standard Hobart mixer at low speed (speed 1) for 1 minute and then at medium speed (speed 2) for 1.5 minutes. The canola oil and lecithin are premixed and then The Stage 3 ingredients were added and mixed with the standard Hobart mixer at low speed (speed 1) for 1.5 minutes. The batter rested for 15 minutes.

The batter was divided into muffin trays with 40 g of batter per cup and baked in a convection oven at 325° F. for 15 minutes. The baked cakes were cooled for 5 minutes in the muffin trays and then for 20 minutes on mesh cooling racks. The cooled cakes were placed in sealed bags/containers with good moisture barrier properties. The target cake moisture content by the Karl Fisher method: 13-14%. The cake has a SDS/TS of 6.7% and an $A_w$ of 0.71. EXAMPLE 2

Sample soft cakes were prepared according to the basic soft cake formulation and method of Example 1, except that in each case all of the whole grain wheat flour was replaced by one of the modified starches listed in Table 2. The RDS, SDS, and RS values for each cake were determined in accordance with the Englyst method and are listed in Table 2 and presented graphically in FIG. 1. The degree of gelatinized starch and $A_W$ are also provided in Table 2.

TABLE 2

| Modified Starches | RDS | SDS | RS | % Gelatinized Starch | Aw |
| --- | --- | --- | --- | --- | --- |
| Maize Starch (native starch) | 38 | 6 | 1 | 33 | 0.73 |
| High Amylose ("HAM") Maize Starch, 70% | 10 | 11 | 24 | 0 |  |
| Sago Starch (native starch) | 26 | 16 | 5 | 20 | 0.74 |
| Low Acid Converted Maize Starch | 31 | 13 | 2 | 52 | 0.75 |

TABLE 2-continued

| Modified Starches | RDS | SDS | RS | % Gelatinized Starch | Aw |
| --- | --- | --- | --- | --- | --- |
| High Acid Converted Maize Starch | 25 | 16 | 4 | 30 | 0.75 |
| Corn Starch Diphosphate - Medium crosslinking level (C-Stabitex 05311) | 38 | 7 | 1 | nd |  |
| Wheat Starch Diphosphate - High crosslinking level | 27 | 9 | 11 | nd |  |

Soft cakes using acid converted maize starches resulted in SDS levels that increased as acid-conversion level increased. The use of acid-converted maize starch increased SDS content of the cake and produced a cake that outperformed similar cakes with high amylose (HAM) starches and crosslinked starches, e.g., C-Stabitex. Cakes prepared with acid converted starches had high levels of SDS and gelatinized starch leading to a firm/cohesive texture which indicates that there was a different mechanism of action to produce a desirable SDS than preservation of native granule integrity. Thus, even with gelatinized starch which contributed to a desirable texture (e.g., a cohesive that is less crumbly) a higher SDS was achieved.

Example 3

Digestibility of Maize Starch and Acid Treated Maize Starches

Maize starch, low acid converted maize starch, and high acid converted maize starch were tested in their native state for amounts of RDS, SDS, and RS in accordance with the Englyst method. The results are presented in Table 3.

TABLE 3

Digestibility of Granular Starches and Whole Grains

| Effect of Acid Conversion | RDS | SDS | RS |
| --- | --- | --- | --- |
| Maize Starch | 24.6 | 62.5 | 12.7 |
| Low Acid Converted Maize Starch | 28.1 | 54.5 | 15.3 |
| High Acid Converted Maize Starch | 19.4 | 53.5 | 24.7 |
| Wheat (Hard Wheat) Starch (e.g., starch component of hard wheat) | 38.7 | 47.8 | 0.4 |
| SAGO | 4.4 | 21.2 | 75.1 |

It is noted that maize starch had a higher SDS level in native form as compared with acid-converted maize starches and SAGO in native form. Yet, as noted below, acid converted maize starches and SAGO yield higher SDS after baking. Soft cakes were prepared in accordance with the formulation of Example 1, except that all of the whole grain wheat flour in the formulation was replaced with one of maize starch, low acid converted maize starch, or high acid converted maize starch for each cake. Each soft cake was prepared in a substantially similar manner as that described in Example 1. The baked cakes were tested for amounts of RDS, SDS, and RS in accordance with the Englyst method as well as the degree of gelatinization. The results are presented in Table 4.

TABLE 4

Digestibility of Starches in Soft Cakes

| Effect of Acid Conversion | RDS | SDS | RS | % Gelatinized starch (by DSC) |
|---|---|---|---|---|
| Maize Starch | 38 | 6 | 1 | 33 |
| Low Acid Converted Maize Starch | 31 | 13 | 2 | 52 |
| High Acid Converted Maize Starch | 25 | 16 | 4 | 34 |

From the data presented in Tables 3-4 it can be concluded that acid converted corn starches can deliver high SDS in a partially gelatinized state.

Example 4

Soft cakes were prepared in accordance with the formulation of Example 1, except that all of the whole grain wheat flour in the formulation was replaced with one of high amylose maize starch (having an amylose ratio of about 70%) maize starch, high acid converted maize starch, low acid converted maize starch, sago starch, wheat starch, or oxidized wheat starch for each soft cake. Each soft cake was prepared in a substantially similar manner as that described in Example 1. The cakes were baked to a diameter of 60 mm and a height of about 40 mm.

The soft cakes were evaluated for the key textural attributes of "crumbliness" and "firmness" using a TA XT Plus texture analyzer (Stable Micro Systems) equipped with a 50 kg load cell. The cake sample was placed between an 80 mm diameter plate (part #TA 30) and a stainless steel test sieve with 8 mm (5/16 inch) opening. A tray was placed under the sieve, directly below the sample.

Compression was applied as the plate travelled downward at 1 mm/sec, squeezing the cake sample, until 30% strain was achieved. The force with which the cake resisted compression was a measure of the "firmness" of the cake (see Table 9). Once the force was removed, the remaining cake sample was gently allowed to slide forward on the screen (with help of a spatula) and then removed. The mass of cake crumbs that fell through the screen (collected on the tray) as a result of the compression test, when expressed as a percentage of the original mass of the cake was reported as the "crumbliness" of the cake (see Table 5).

TABLE 5

| Sample | % Crumbliness | Force (g) - firmness | % Gelatinized starch | SDS |
|---|---|---|---|---|
| High Amylose Maize Starch (~70% AM) | 13.86 (±7.24) | 1257 (±251) | 0 | 11.3 |
| Maize Starch | 0.13 (±0.04) | 2985 (±142) | 33 | 6.5 |
| High Acid Converted Maize Starch | 1.18 (±0.66) | 1667 (±180) | 34 | 16.4 |
| Sago Starch | 0.22 (±0.19) | 1749 (±125) | 20 | 15.5 |
| Wheat Starch | 0.37 (±0.52) | 1490 (±227) | tbd | 3.7 |
| Oxidized Wheat Starch | 0.15 (±0.08) | 2669 (±77) | tbd | 5.4 |

Cake made from High Amylose Maize starch (70% amylose), which remained mostly ungelatinized during baking (and without being bound by theory, did not benefit from the continuous matrix provided by gelatinized starch) lacked a cohesive structure and was therefore significantly crumbly. Note that this sample was also softer. However, the firmness (force) was not significantly different from High Acid Cony. Starch, which was 34% gelatinized. It was surprisingly noted that the tested baked goods had high SDS levels and low crumbliness levels.

Example 5

In Situ Gelatinization

Sample 1 was prepared from a slurry of 40% high acid converted maize starch and 60% deionized water, cooked via Rapid Viscoanalyzer (RVA) under stirring (160 RPM) at 67.5° C. for ten minutes to gelatinize the starch and was cooled under liquid $N_2$ for five minutes to inhibit retrogradation. Sample 2 was prepared from a slurry of 40% high acid conversion maize starch and 60% deionized water, cooked via RVA under stirring (160 RPM) at 67.5° C. for ten minutes and was cooled for 1 hour at room temperature, at which point it was cooled under liquid $N_2$ for five minutes. Sample 3 was prepared from a slurry of 40% high acid conversion maize starch and 60% deionized water, cooked via RVA under stirring (160 RPM) at 75° C. for ten minutes and was cooled under liquid $N_2$ for five minutes to inhibit further retrogradation. Sample 4 was prepared from a slurry of 40% high acid conversion maize starch and 60% deionized water, cooked via RVA under stirring (160 RPM) at 75° C. for ten minutes and was cooled for 1 hour at room temperature, at which point it was cooled under liquid $N_2$ for five minutes to inhibit further retrogradation. Each of the four samples was then cryomilled and passed through 100 mesh sieve to ensure uniform particle size. RDS, STS, RS, and TS values were determined in accordance with the Englyst method and are provided in Table 6.

TABLE 6

| Sample Starch | RDS | SDS | RS | TS |
|---|---|---|---|---|
| Sample 1 | 67.5 | 28.4 | 7.4 | 103.3 |
| Sample 2 | 63.9 | 29.1 | 8.5 | 101.5 |
| Sample 3 | 93.9 | 3.7 | 4.3 | 105.5 |
| Sample 4 | 95.5 | 4.1 | 6.0 | 101.8 |

Figure 2:
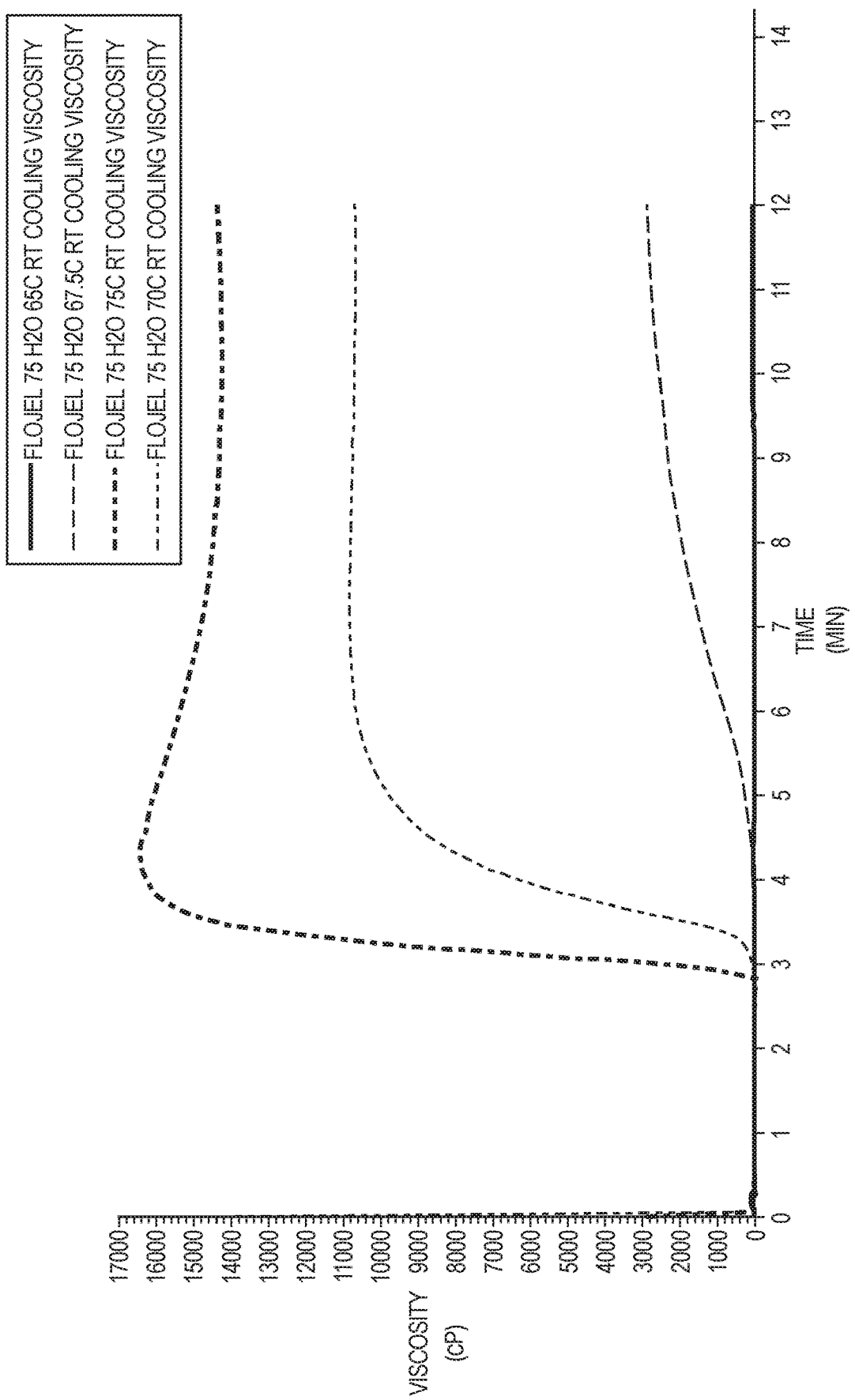
FIG. 2 is a graph of viscosity measurements of starch in an embodiment of an invention.

High moisture systems may gelatinize more readily. Yet, it is noted here that even in a high moisture environment, high levels of SDS can be achieved. It is also noted that under higher temperature gelatinization, lower SDS levels resulted. FIG. 2 shows increase in viscosity as temperature increases, which signifies the degree of gelatinization Example 6

Except where cooked with RVA as noted in Table 7, slurries of 40% high acid converted maize starch ("Hi AC Starch") and 60% deionized water were thermally treated by sealing the slurry in a plastic tube, immersing the tube in a water-bath set at either 67.5° C. or 70° C., and oscillating or rocking the test tube with the aim of ensuring dispersion (avoiding gravitational settling) and yet minimizing the shear experienced by the sample. The samples were stored at 4° C. for varying amounts of time, at which point the samples were cooled under liquid nitrogen for five minutes to inhibit further retrogradation, then cryomilled and passed through 100 mesh sieve to ensure uniform particle size. RDS, SDS, RS, and TS were measured in accordance with the Englyst method. Percent gelatinization of the starch was measured using differential scanning calorimetry at greater than 60° C., as described in US20090220654A1, and Holm, J., Lundquist, I., Bjorck, I., Eliasson, A. & Asp, N. Degree of starch gelatinization, digestion rate of starch in vitro, and metabolic response in rats. *Am J Clin Nutr* 47, 1010-1016 (1988), each of which is incorporated by reference herein in its entirety.

TABLE 7

| Starch | Cooking Temp (° C.) | Storage time 4° C. | RDS | SDS | RS | TS | % Gelatinized Starch (DSC) |
|---|---|---|---|---|---|---|---|
| Hi AC Starch | 67.5 | $T_0$ | 70.9 | 24.8 | 7.06 | 102.76 | 39.09 |
| Hi AC Starch | 67.5 | 24 h | 69.9 | 25 | 7.86 | 102.76 | 36.57 |
| Hi AC Starch | 67.5 | 7 days | 70.5 | 24.5 | 7.89 | 102.89 | 41.19 |
| Hi AC Starch | 67.5 | $T_0$ RVA Cooked (From Example 5) | 69.6 | 28.4 | 7.6 | 103.3 | 37.40 |
| Hi AC Starch | 70 | $T_0$ | 85.4 | 16.6 | 5.5 | TBD | 61.29 |
| Hi AC Starch | 70 | 24 h | 82.8 | 17.2 | 6.9 | TBD | 52.80 |
| Hi AC Starch | 70 | 7 days | 82.2 | 19.1 | 7.5 | TBD | 52.75 |
| Hi AC Starch | 70 | $T_0$ RVA Cooked (From Example 5) | 86.8 | 13.5 | 5.1 | 101.8 | 68 |

This example shows that thermally treating high acid converted starch around the gelatinization temperature, therefore gelatinizing 30% or greater of the starch, can still maintain the SDS properties of the high acid converted starch. Gelatinizing greater than 50% of the high acid-converted starch seems to slightly increase SDS as the starch is allowed to retrograde (e.g., at 24 h and 7 days storage time). High shear cooking in a rapid visco analyser (RVA) seems to affect SDS at higher temperatures (e.g., 70° C.) compared to 67.5° C. The difference in SDS results between rows 1 and 4 and rows 5 and 8 can be attributed to differences in such shear experienced by the sample.

Slurries in a ratio of 1:2 of high acid converted maize starch ("Hi AC Starch") to deionized water were thermally treated in a high-volume pan from 15° C. to 160° C. at a heating rate 2° C./min, then cooled to 15° C., then reheated to 160° C. at a heating rate of 2° C./min and stored, as shown in Table 8. The degree of gelatinization was detected by differential scanning calorimeter ("DSC") (TA Q100, TA Instruments, New Castle, Del., USA).

TABLE 8

| Starch | Cook Temp (° C.) | Storage time 4° C. | Gelatinization Temp | | $\Delta H_{gel}$ (J/g)-Norm. | % Degree of Gelatinization | AP Retrogradation | | $\Delta H_{APRet}$ (J/g)-Norm |
|---|---|---|---|---|---|---|---|---|---|
| | | | $T_0$ (° C.) | $T_p$ (° C.) | | | $T_0$ (° C.) | $T_p$ (° C.) | |
| Hi AC Starch | Native | N/A | 68.59 | 73.08 | 18.21 | — | — | — | — |
| Hi AC Starch | 67.5 | $T_0$ | 72.05 | 75.1 | 11.09 | 39.09 | — | — | — |
| Hi AC Starch | 67.5 | 24 h | 71.91 | 74.84 | 11.55 | 36.57 | 41.7 | 49.9 | 0.27 |
| Hi AC Starch | 67.5 | 7 days | 72.15 | 75.17 | 10.71 | 41.19 | 41.0 | 48.8 | 0.57 |
| Hi AC Starch | 67.5 | $T_0$ RVA Cooked (From Example 5) | 71.4 | 74.47 | 11.4 | 37.4 | — | — | — |
| Hi AC Starch | 70 | T0 | 73.96 | 77.16 | 7.05 | 61.29 | — | — | — |
| Hi AC Starch | 70 | 24 h | 73.25 | 76.29 | 8.6 | 52.8 | 41.2 | 48 | 0.5 |
| Hi AC Starch | 70 | 7 days | 73.5 | 76.65 | 8.6 | 52.75 | 41 | 48.8 | 0.8 |
| Hi AC Starch | 70 | $T_0$ RVA Cooked (From Example 5) | 74.38 | 77.34 | 5.8 | 68.04 | — | — | — |

All starches displaying >30% gelatinization demonstrated amylopectin (AP) retrogradation via DSC when undergoing typical retrogradation conditions. Hi AC starches containing >50% gelatinized exhibited the highest AP retrogradation after seven (7) days.

Tables 7 and 8 show that significant SDS is retained through pre-cooking starch to between 30 and 68% gelatinization as measured by DSC, a slight increase in SDS may be achieved through controlling retrogradation conditions, and that pre-gelling acid-converted corn starch to greater than 50% gelatinization (70° C.) cook temperature slightly increases SDS through retrogradation.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. Unless specifically set forth herein, the terms "a", "an" and "the" are not limited to one element but instead should be read as meaning "at least one".

We claim:

1. A cohesive baked good comprising:
   a slowly digestible starch content of at least 14 g per 100 g of the baked good,
   a water activity of the baked good of at least 0.7; and
   a total starch content having an amylose ratio of 5% to 40%, wherein at least 30% of the total starch content is gelatinized; and
   wherein the baked good has a firmness of less than 2000 g under 30% compression strain and has a crumbliness of less than 5% after application of 30% compression strain.

2. The baked good of claim 1 wherein at least 5% of the total starch content is an acid-converted maize starch, a sago starch, or a combination thereof.

3. The baked good of claim 1, wherein the baked good is without inclusions, a filling, and a topping.

4. The baked good according to claim 1, wherein at least 30% and up to 80% of the total starch content of the baked good is gelatinized.

5. The baked good according to claim 1, wherein at least 50% and up to 80% of the total starch content of the baked good is gelatinized.

6. The baked good according to claim 1, wherein 30% to 70% of the total starch content of the baked good is gelatinized.

7. The baked good according to claim 1, wherein at least 5% of the total starch content is a maize starch that has been at least partially hydrolyzed by an acid.

8. The baked good according to claim 7, wherein the acid is a mineral acid.

9. The baked good according to claim 7, wherein the acid is hydrochloric acid.

10. The baked good according to claim 7, wherein the acid is sulfuric acid.

11. The baked good according to claim 1, wherein at least 5% of the total starch content is a sago starch.

12. The baked good according to claim 1, wherein the total starch content comprises a starch having an amylose ratio of 15% to 35%.

13. The baked good according to claim 1, wherein the total starch content comprises a starch comprising amylopectin having an $R_{HAP}$ less than 116 nm.

14. The baked good according to claim 1, wherein the total starch content consists essentially of a sago starch, a maize starch that has been at least partially hydrolyzed by an acid, or a combination thereof.

15. A method of producing a cohesive baked good comprising:
    admixing a starch component with one or more additional ingredients to form a batter or dough having a total starch content, the total starch content having an amylose ratio of 5% to 40%;
    baking the batter or dough to gelatinize at least 30% of the total starch content and form the baked good,
    wherein the baked good has a firmness of less than 2000 g under 30% compression strain and has a crumbliness of less than 5% after application of 30% compression strain, a slowly digestible starch content of at least 15 g per 100 grams of the baked good, and a water activity of at least 0.7.

16. The method according to claim 15, wherein the baking gelatinizes at least 50% of the total starch content.

17. The method according to claim 15, wherein the baking gelatinizes 30% to 68% of the total starch content.

18. The method according to claim 15, wherein at least 5% of the total starch content is a maize starch that has been at least partially hydrolyzed by an acid.

19. The method according to claim 15, wherein at least 5% of the total starch content comprises a sago starch.

20. The method according to claim 15, wherein the total starch content comprises a starch comprising amylopectin having an $R_{HAP}$ less than 116 nm.

21. The method according to claim 15, wherein the total starch content consists essentially of a sago starch, a maize starch that has been at least partially hydrolyzed by an acid, or a combination thereof.

22. The method according to claim 15, wherein at least 5% of the total starch content is an acid-converted maize starch, a sago starch, or a combination thereof.

* * * * *